United States Patent [19]
Suard et al.

[11] Patent Number: 5,548,834
[45] Date of Patent: Aug. 20, 1996

[54] RADIO TELECOMMUNICATION SYSTEM WITH A MULTI-SENSOR RECEIVER STATION AND A PLURALITY OF EMITTER STATIONS TRANSMITTING DATA PACKETS

[75] Inventors: Bruno P. Suard, Neuilly; Vinod Kumar, Paris, both of France

[73] Assignee: Alcatel N.V., Rijswijk, Netherlands

[21] Appl. No.: 282,888

[22] Filed: Jul. 29, 1994

[30] Foreign Application Priority Data

Aug. 3, 1993 [EP] European Pat. Off. .............. 93202291

[51] Int. Cl.⁶ .................................................... H04B 7/02
[52] U.S. Cl. .......................... 455/276.1; 455/63; 455/137; 455/273; 455/278.1
[58] Field of Search .............................. 455/63, 65, 52.1, 455/52.3, 273, 277.1, 276.1, 277.2, 278.1, 45, 129, 49.1, 272, 132, 137, 138, 139; 370/94.1, 95.3

[56] References Cited

U.S. PATENT DOCUMENTS

| | | | |
|---|---|---|---|
| 4,517,562 | 5/1985 | Martinez | 455/45 |
| 4,850,037 | 7/1989 | Bochmann | 455/276.1 |
| 4,939,791 | 7/1990 | Bochmann et al. | 455/276.1 |
| 5,274,844 | 12/1993 | Harrison et al. | 455/276.1 |
| 5,287,067 | 2/1994 | Denno et al. | 375/325 |

OTHER PUBLICATIONS

"Experimental Results from a Self–Calibrating Digital Beamforming Array", J. Herd, *1990 International Symposium Digest Antennas and Propagation*, vol. I, May 1990, New York, pp. 384–387.

"Wiener Solution for the Broadband Griffiths–Jim Beamformers", I. Claesson et al, *1990 International Symposium Digest Antennas and Propagation*, vol. I, May 1990, New York, pp. 202–205.

"Improving the Performance of a Slotted ALOHA Packet Radio Network with an Adaptive Array", J. Ward et al, *IEEE Transactions on Communications*, vol. 40, No. 2, Feb. 1992, pp. 292–300.

"Digital Communications—Fundamentals and Applications", B. Sklar, Prentice–Hall International, Inc., 1933, Chapter 9, pp. 475–505.

Global System for Mobile Communications, GSM Recommendation 05.02, "Multiplexing and Multiple Access on the Radio Path", Jan. 1990, pp. 1–36.

*Primary Examiner*—Reinhard J. Eisenzopf
*Assistant Examiner*—Doris To
*Attorney, Agent, or Firm*—Ware, Fressola, van Der Sluys & Adolphson

[57] ABSTRACT

Several emitter stations (MS1–MS4) are allowed to transmit call set-up packets in random access channels and user information packets in traffic channels to a receiver station (BST) which is provided with an array of N sensors ($A_1$–$A_N$) and with a receiver (RM) adapted to simultaneously acquire N–1 packets from the emitting stations and to derive therefrom N–1 distinct array output signals ($X_1$–$X_{N-1}$). During a random access channel (RACH) channel, the identity of the emitting station (MS) as well as the direction of arrival ($\theta$) and the power ($\sigma$) of its signal are stored in a parameter data base (PDB) together with its weigh vector ($\underline{W}$) calculated (WVG) therewith and a traffic channel (TCH) channel allocated (CHC) thereto. During either a RACH or a TCH channel, the weight vectors of a emitting station are provided by the data base and are applied to multipliers ($M_1$–$M_{N-1}$) which produce the N–1 array output signals. In case of interference between emitting stations using a same TCH channel, another TCH channel is allocated to one of the interfering stations and the weight vectors are updated. The stations also send tracking packets in the RACH channel to update their parameters and accordingly the weight vectors in the data base. The present radio telecommunication system is particularly suitable, e.g., for the pan-European "Global System for Mobile communications" GSM wherein the emitter stations are mobile stations and for similar systems elsewhere.

20 Claims, 2 Drawing Sheets

RADIO TELECOMMUNICATION SYSTEM WITH A MULTI-SENSOR RECEIVER STATION AND A PLURALITY OF EMITTER STATIONS TRANSMITTING DATA PACKETS

TECHNICAL FIELD

The present invention relates to a radio telecommunication system including a plurality of emitter stations adapted to transmit packets of data in predetermined channels of a radio link to a receiver station provided with an array of sensors for capturing the transmitted data and with receiver means coupled to said array of sensors and adapted to generate array output signals at array output terminals of said receiver station, said receiver means including a weight vector supplier means coupled to said array of sensors and adapted to derive weight vectors from the captured data, and a plurality of multiplier means coupled to said array of sensors and to said weight vector supplier means for providing said array output signals as a function of the product of said captured data and weight vectors.

BACKGROUND OF THE INVENTION

Such a radio telecommunication system is already known in the art, e.g. from the article "Improving the Performance of a Slotted ALOHA Packet Radio Network with an Adaptive Array" by A. Ward and R. T. Compton, published in IEEE TRANSACTIONS ON COMMUNICATIONS, VOL.40, NO.2, February 1992, pages 292 to 300. Therein, the data packets are transmitted according to the well known Slotted-ALOHA (S-ALOHA) scheme which is for instance described in the book "DIGITAL COMMUNICATIONS—Fundamentals and Applications" of B. Sklar, edited by Prentice-Hall International, Inc., 1988, and more particularly in Chapter 9, pages 475 to 505, thereof. A problem with the S-ALOHA is that when two or more emitter stations are simultaneously transmitting data packets in a same channel, a collision occurs so that the receiver station is no longer able to distinguish between the emitter stations from which the data packets are received. As a consequence, all these data packets are then generally rejected and the emitter stations have to transmit them again. Obviously this leads to an important increase of the traffic load on the radio link.

This problem with the S-ALOHA scheme is partially solved in the system according to the above mentioned article by the use of an adaptive array of sensors or antennas instead of the generally used omnidirectional antenna. The performance of the radio telecommunication system is thereby improved as will be explained below.

When the emitter stations are not transmitting data packets, the array of sensors operates as an omnidirectional antenna and is thus adapted to capture any data packet coming from any direction, i.e. from any of the emitter stations. After having detected the beginning, i.e. a training sequence of bits, of such a data packet transmitted by an emitting station, the receiver station points its antenna array in the direction of this transmitting emitter station, thereby ignoring then other data packet transmitted by other emitting stations. However, such pointing in the correct direction is only possible if two (or more) data packets simultaneously transmitted are separated geographically and in time, i.e. are incoming from different directions and mutually shifted over a certain number of bits. In this case, only the firstly arriving data packet is accepted by the receiver station, while any following data packet transmitted by another emitter station in the same channel is ignored.

The improvement proposed in the above article increases significantly the capacity of some radio telecommunication applications since, in case of collision, the colliding data packets are not systematically rejected all, but the first one of them is generally accepted. Moreover, a data packet which is not accepted during a first predetermined channel because of a collision will generally be accepted after a few transmission retrials in other channels. This means that, even if as in the above known radio telecommunication system all the channels of a time frame of the radio link may be used to transmit and receive data packets, the collisions still lead to a traffic overload.

This remaining drawback of traffic increase is even more significant in case of a mobile radio telecommunication system wherein generally only a single predetermined channel of each time frame of the radio link may be used by the mobile emitter stations to transmit a so-called "call set-up packet" to the fixed base receiver station in order to establish a communication therewith. In such a mobile communication system the other channels of the radio link either are used for transmitting signalling information or are individually allocated by the base station to distinct mobile stations for communication therewith by means of "user information packets".

The problem just described for instance occurs in the pan-European "Global System for Mobile communications" GSM which is a digital cellular network wherein each cell includes one base station and a plurality of mobile stations moving in the cell. Since the mobile stations are allowed to transmit call set-up packets to the base station only in a single predetermined channel of a radio link, i.e. at a predetermined frequency of this radio link and during a predetermined time slot thereof, there is a relatively high risk of collision of such packets transmitted by the mobile stations and simultaneously attempting to access the base station.

A possible solution to decrease the possibility of collision is to increase the number of predetermined channels in which the mobile stations are allowed to transmit call set-up packets. However, this solution gives rise to a low efficiency of use of the resources of the base station because these channels are then not available for other purposes such as signalling or normal communication traffic, as mentioned above.

Even if the improvement disclosed in the above article would be applied to the particular case of a mobile telecommunication system, such as GSM, the traffic load of the base station would still be too high because of the necessary re-transmission of colliding packets which were ignored by the base station, i.e. which did not arrive first in the predetermined channel. Moreover, in the known system only some colliding call set-up packets may be recovered, while colliding user information packets may not be saved. This is due to the fact that the duration of a call set-up packet is shorter than the duration of the predetermined channel whereby, as mentioned above, the first one of several call set-up packets received in a same predetermined channel but sufficiently shifted in time may be recognized by the receiver station. On the other hand, the duration of a user information packet corresponds substantially to the duration of the channel whereby the time shift of two or more user information packets received in a same channel is never sufficient for the receiver station to separate them.

DISCLOSURE OF INVENTION

An object of the present invention is to provide a radio telecommunication system of the above known type but wherein the number of data packets acquired, i.e. captured and handled by the receiver station, is relatively much higher and which is particularly adapted to be used in the mobile communication field.

According to the invention, this object is achieved due to the fact that said receiver means further includes signal processing means coupled between said array of sensors and both said weight vector supplier means and said plurality of multiplier means and adapted to generate from said captured data a signal vector from which said weight vector supplier means derives a plurality of weight vectors, and that such weight vectors are applied to distinct ones of said multiplier means.

In this way, each multiplier means receives both the signal vector and a weight vector corresponding to a data packet transmitted by a particular emitter station. It is thus possible to simultaneously acquire several data packets transmitted in a same predetermined channel, i.e. data packets from different emitter stations. This is valid for call set-up packets as well as for user information packets.

In the particular case of call set-up packets, once the first bits of the packet are received by the base station, the signal processing means generates a corresponding signal vector. From this signal vector the weight vector supplier means derives a first weight vector which is applied, together with the signal vector to one of the multiplier means. This multiplier means then produces an array output signal which corresponds to the product of the signal vector and the weight vector. If a second data packet transmitted by another emitter station arrives slightly later and from another direction than the first received data packet but still during the same predetermined channel, the signal processing means generates another signal vector from which the weight vector supplier means derives two weight vectors which are respectively applied to the above one and to another multiplier means of the plurality. As a result, two array output signals, each corresponding to one of the received data packets, are available at two distinct array output terminals of the receiver station. The same is true for a third, fourth, ... data packet received in the same predetermined channel. Moreover, no specific training bit sequence is required within the data packet and it can be proved that the data packets only need to be separated by about 1.5 bit in the case of a GSM signal.

As already mentioned, several data packets transmitted by different emitter stations in a same predetermined channel may thus be accepted and validly handled by the receiver station of the radio telecommunication system. As a result, the above mentioned traffic increase due to collisions of data packets, more particularly call set-up packets, no longer occur even in the particular case of a mobile telecommunication system such as GSM wherein these call set-up packets may only be transmitted in a single predetermined channel of the time frame.

Another characteristic feature of the present invention is that each of said predetermined channels is a predetermined time slot at a predetermined frequency of said radio link, and that said weight vector supplier means includes the series coupling of a weight parameter estimator which derives a plurality of weight parameters from said signal vector and a weight vector generator which calculates, from said derived weight parameters, said plurality of weight vectors.

The weight parameters of an emitter station are for instance the direction of arrival of, its data packets with respect to the array of sensors and the signal power of the captured data. From these weight parameters the weight vector generator may calculate a weight vector for each particular transmitting emitter station.

Moreover, said weight vector supplier means further includes a parameter data base coupled between said weight vector generator and said multiplier means for storing said derived weight parameters and calculated weight vectors.

Once provided by the weight parameter estimator, each transmitting emitter station has its weight parameters stored in the parameter data base. However, as will be explained later, the weight vectors are calculated as a function of the weight parameters of all the emitter stations transmitting user information packets in a same channel and are thus subjected to possible modifications.

Also another characteristic feature of the present invention is that said weight vector supplier means further includes a time window filter means coupled between said signal processing means and said weight parameter estimator and controlled by a timing control means also included in said weight vector supplier means, said time window filter means allowing said signal vector to be transmitted to said weight parameter estimator only during first ones of said predetermined channels thereby allowing said weight parameter estimator to derive said plurality of weight parameters from said captured data only during said first predetermined channels.

The weight vectors are thus calculated only during these first predetermined channels which are those in which the above call set-up packets are transmitted.

On the one hand, during said first predetermined channels said weight vectors calculated by said weight vector generator are applied to said multiplier means and said weight parameters are stored in said parameter data base.

On the other hand, during second predetermined channels different from said first predetermined channels, weight vectors are applied to said multiplier means.

The second predetermined channels are those in which the user information packets are transmitted. The present receiver means are thus not only able to acquire several call set-up packets in a same first channel but are also able to acquire several user information packets in a same second channel. This increases even more the traffic capacity of the radio telecommunication system.

Still another characteristic feature of the present invention is that said array output terminals are connected to a channel controller adapted to allocate a said second predetermined channel to each emitting station transmitting a said call set-up packet during a said first predetermined channel, and that said channel controller is coupled to said parameter data base which stores the identification of said allocated second predetermined channel.

Moreover, said channel controller is coupled to said parameter data base via said weight vector generator which calculates the weight vector for said emitting station in said allocated second predetermined channel as a function of data stored in said parameter data base and relating to said allocated second predetermined channel.

The parameter data base thus stores for each emitting station its identity, the identification of its allocated channel, its weight parameters and its weight vector, the latter being calculated by taking into account stored information concerning other emitter stations also transmitting user information packets in the same allocated channel.

Yet another characteristic feature of the present invention is that said channel controller is further adapted to allocate another one of said second predetermined channel to said emitting station when the communication quality of the latter is below a predetermined level, and that said weight vector generator then calculates, for all the emitting stations in both the previous and said other second predetermined channel allocated to said emitting station, new weight vectors as a function of data stored in said parameter data base and relating to said emitting station and to both said previous and said other allocated second predetermined channels.

When the quality of the communication between the emitting station and the receiver station becomes too bad, e.g. because of possible interferences with other emitter stations using the same allocated channel, another channel is allocated to the emitting station. This operation is called "intra cell hand over".

A further characteristic feature of the present invention is that when a communication is established with said base stations said emitting station transmits said tracking packets in said first predetermined channels, that said weight parameter estimator derives from said tracking packets new weight parameters which are stored in said parameter data base, that said weight vector generator accordingly calculates new weight vectors for all the emitting stations in the second predetermined channel allocated to said emitting station transmitting said tracking packets, and that said new weight vectors are also stored in said parameter data base.

These tracking packets are similar to the above call set-up packets but they are used when a communication is already established for continuously updating the emitting station's data stored in the parameter data base in order to optimize the quality of this communication.

Still another characteristic feature of the present invention is that said array of sensors includes N antenna elements, that said weight vector supplier means produces a maximum of N-1 weight vectors, and that said plurality of multiplier means includes N-1 multiplier means coupled to N-1 of said array output terminals.

In this way, up to N-1 data packets can be acquired by the receiver station which in response then produces N-1 distinct array output signals. Therefore the probability of collision between call set-up packets is decreased by separating up to N-1 packets in a first channel and up to N-1 users are simultaneously allowed to access a same second channel.

Although any kind of array geometry may be used, in a preferred embodiment said array of sensors is an Uniform Linear Array (ULA) and said N antenna elements are identical isotropic sensors uniformly separated.

Yet another characteristic feature of the present invention is that said weight parameter estimator is a Wiener filter estimator.

By using the weight vectors stored in the parameter data base, the array of sensors may be seen as pointing in a predetermined direction, e.g. towards an emitter station, instead of covering an area in an omnidirectional way. The signal received from this emitter station may then be measured with a relatively high accuracy. For instance, the "Time Of Arrival" TOA of the data packets may be measured with an higher accuracy than in the case of using an omnidirectional antenna.

Another advantage of the present radio telecommunication system is that it is insensitive to noise and to jamming sources as long as the jam generated by the latter has not the same direction of arrival with respect to the array of sensors as one of the emitting stations.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
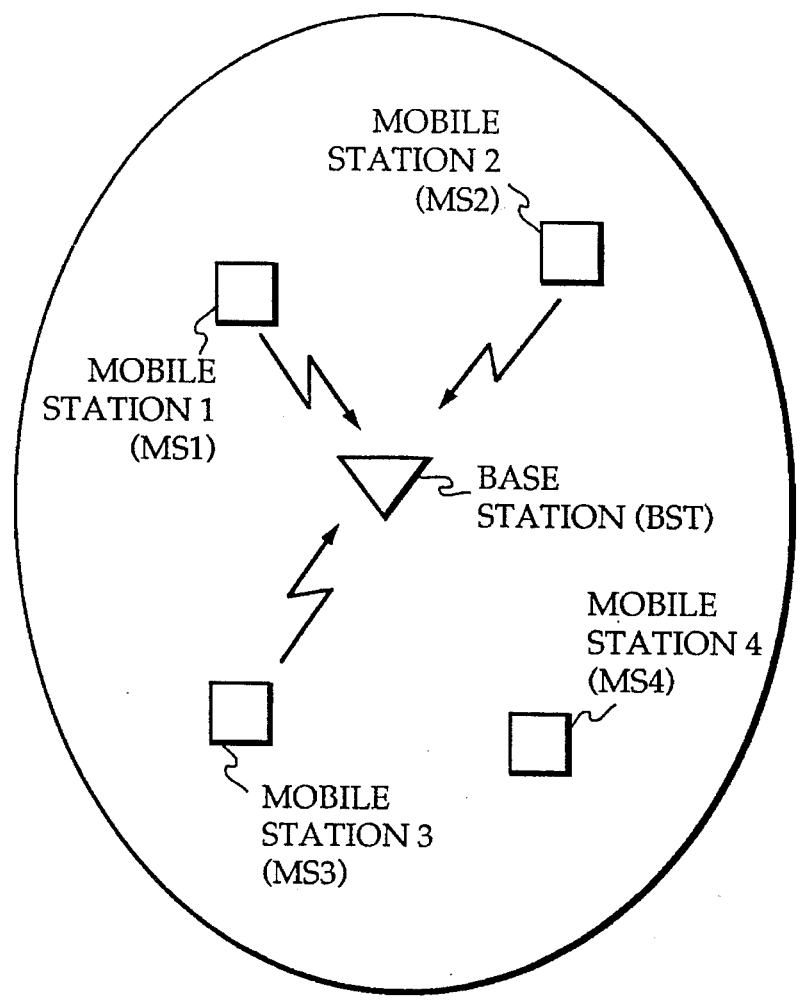
FIG. 1 shows mobile stations MS1 to MS4 and a base station BTS forming part of a radio telecommunication system according to the invention.

The radio telecommunication system shown in FIG. 1 is a mobile communication system forming part of the known pan-European digital cellular "Global System for Mobile communications" (GSM) network. This mobile communication system GSM comprises fixed base stations, such as BST, forming part of a public telephone network (not shown), and portable telephones or mobile stations such as MS1 to MS4, more generally hereafter referred to as MS, linked to the base stations via radio links. Each base station BTS is located in its own area called "cell" and is able to communicate with any mobile station MS moving in its cell.

In each cell of GSM the mobile stations MS may transmit packets of data to the base station BST and vice versa in predetermined channels of a radio link. Each channel corresponds to a predetermined time slot and has a predetermined carrier frequency. The uplink frequency band used for transmissions from the mobile stations MS to the base station BST ranges from 890 to 915 MHz, while the downlink frequency band used for transmissions from the base station BST to the mobile stations MS ranges from 935 to 960 MHz. In both these frequency bands 124 carrier frequencies are used. These carrier frequencies are separated by 200 KHz and corresponding carrier frequencies in the uplink and downlink frequency bands are separated by 45 MHz. 8 time slots of the radio link, each having a length or width of 156.25 bits and being referred to as TS0 to TS7, form a time frame. Such a time frame thus has a length of 1250 bits.

As already mentioned, in a cell the base station BST and the mobile stations Ms communicate with each other by means of data packets transmitted/received in the above channels. For any particular communication with a mobile station MS, the base station BST allocates one or more Traffic CHannels TCH in the uplink and in the downlink frequency bands. These TCH channels are freed when the communication is completed.

Furthermore, the base station BST reserves the time slots of the time frames at a particular carrier frequency in each frequency band for transmitting/receiving signalling and other traffic control information. The reserved frequency is called "Broadcast Common Control Channel" or BCCH frequency. For instance, in the downlink frequency band the base station BST broadcasts synchronization pulses at the BCCH frequency. These are frame pulses used by all the mobile stations MS moving in the cell as reference signals for synchronizing their transmission thereto. To avoid interference problems different BCCH frequencies are used by the base stations of neighbouring cells.

Only one time slot, generally the first one TS0, of the BCCH frequency in the uplink frequency band is used by the mobile stations MS moving in a cell for transmitting call set-up packets towards the base station BST of that cell. This particular time slot TS0 at the BCCH frequency is called "Random Access CHannel" RACH and the call set-up packet that each mobile station MS is allowed to transmit therein is called "RACH burst" or access burst and is hereafter generally referred to as SUP.

When received by the base station BST, such a call set-up packet or access burst SUP is used to initiate a communication with the transmitting mobile stations MS. In other words, each mobile station, say MS1, which wants to establish a communication with the base station BST transmits thereto a call set-up packet SUP1 in the RACH channel.

Both the Random Access CHannel RACH of the uplink frequency band and access burst structure are described in the "ETSI/TC GSM Recommendation GSM 05.02" entitled "Multiplexing and Multiple Access on the Radio Path", Version 3.4.1 of January 1990. Furthermore, an access burst SUP is transmitted according to the known "Slotted-ALOHA" S-ALOHA transmission scheme which is described in detail in the above mentioned book of B. Sklar.

An access burst SUP has a length or width of 96 bits and the duration of its transmission is thus shorter than the duration of the time slot TS0 (156.25 bits) at the BCCH frequency. As a result, as long as the reception of an access burst SUP by the base station BST is completed within the RACH channel, the beginning, i.e. the first bit, of this access burst SUP may be received at different time moments with respect to the beginning of this time slot TS0.

Because a mobile station, e.g. MS1, which is transmitting a call set-up packet SUP1 cannot know whether one or more other mobile stations MS2 to MS4 moving in the same cell are also transmitting an access burst, it may happen that two or more mobile stations MS simultaneously attempt to access the base station BST. In that case a collision occurs in the RACH channel commonly used by the transmitting mobile stations.

Figure 2:
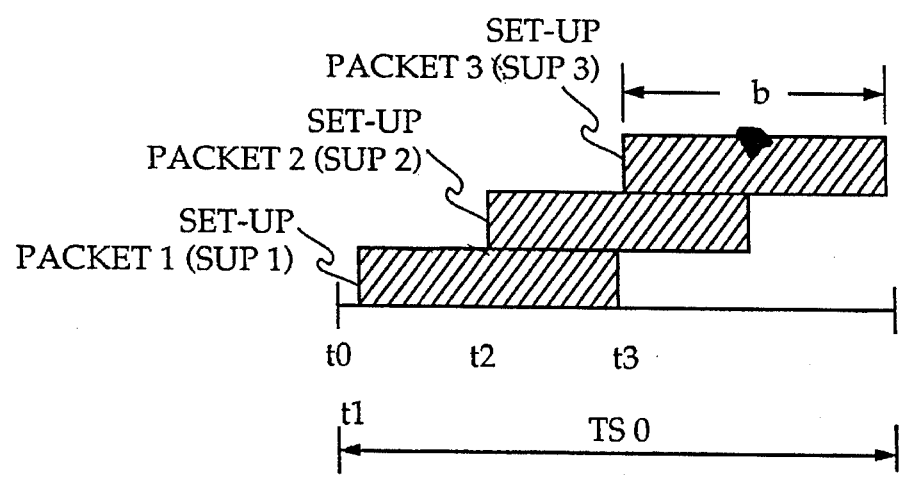
FIG. 2 represents a possible overlapping of access bursts SUP1 to SUP3 transmitted by the mobile stations MS1 to MS3 of FIG. 1.

Such a case is described in the following example and illustrated by FIG. 2. Therein, three mobile stations MS1, MS2 and MS3 simultaneously try to access the base station BST. All the three mobile stations MS1 to MS3 are transmitting an access burst or call set-up packet SUP1 to SUP3 respectively in the RACH channel, i.e. during the time slot TS0, and in synchronism with the base station BST. These access bursts each have a duration b which is shorter than the duration of TS0. Moreover, for purposes of the example, MS1 is supposed to be near to BST, MS2 is further away from BTS and MS3 is very far from BST.

As the distance between the transmitting mobile stations MS1 to MS3 and the base station BST is different it is obvious that the corresponding call set-up packets SUP1 to SUP3 arrive at different moments or time positions in the RACH channel. For instance, the beginning of the call set-up packet SUP1 transmitted by MS1 is received in the base station BST at a moment t1 which is after t0, the start of the time slot TS0. Because of their longer distance to the base station BST, the call set-up packets SUP2 and SUP3 of the mobile stations MS2 and MS3 are received at later moments t2 and t3 respectively.

Figure 3:
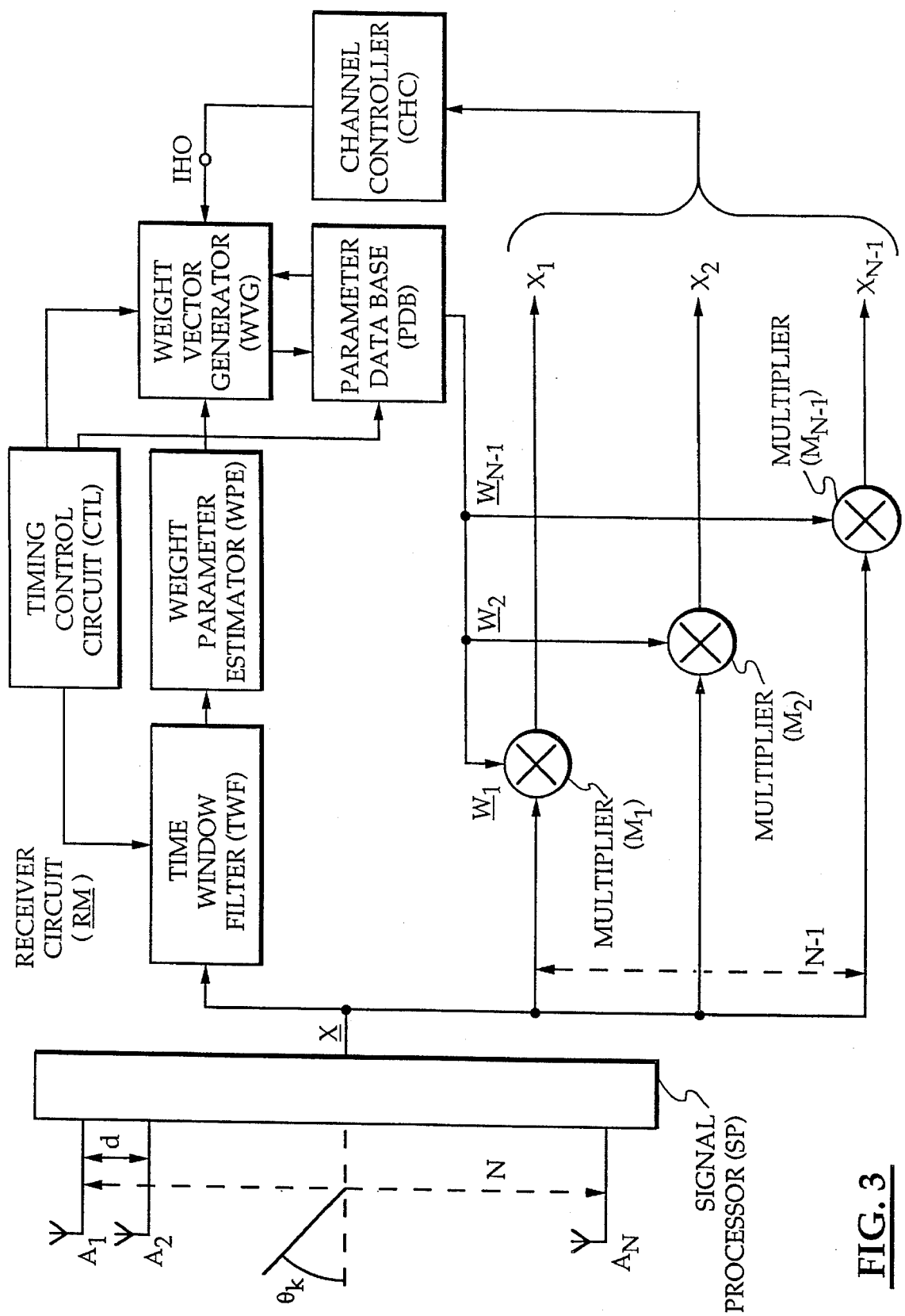
FIG. 3 is a schematic view of a receiver circuit RM used in the base station BTS of FIG. 1.

In order to acquire, i.e. to capture and to handle correctly more than one call set-up packet SUP, the base station BST is provided with an array of sensors or antennas and a receiver circuit RM described below in relation with FIG. 3. It can be proved that, owing to these means, all three call set-up packets SUP1, SUP2 and SUP3 may be captured if the mobile stations MS1 to MS3 are seen at different angles by the array of sensors and if the distance between the moments t1 and t2 and between the moments t2 and t3 is equal to at least 1.5 bit. If at least one of the distances t1–t2 or t2–t3 is shorter than 1.5 bit the interference of the colliding access bursts or call set-up packets SUP1, SUP2 and SUP3 is such that they cannot be distinguished by the base station BST. Therefore they are then all dropped and the three mobile stations MS1 to MS3 all have to re-transmit another access burst in another RACH channel.

It is to be noted that in the present GSM application a distance of about 1.5 bit corresponds to a temporal separation of 5 μsec and that, as will be explained later, this period is sufficient to estimate the properties of the incoming signal. Further, it will also be explained that the receiver circuit RM allows several mobile stations MS to communicate with the base station BST over a same traffic channel TCH.

To acquire the call set-up packets SUP1 to SUP3 separated by more than 1.5 bit and to allow several mobile stations to communicate over a same channel TCH, the base station BST is provided with an array of sensors or antennas which may have any geometry. However, in a preferred embodiment this array is an Uniform Linear Array (ULA) including N identical isotropic sensors $A_1$ to $A_N$ separated by equal distances of d cm, N being an integer equal to or greater than 2. This straightforward geometry makes the processing algorithms of the receiver circuit RM relatively simple and fast. Furthermore, it is supposed that the angle from which the array of sensors sees a mobile station is referred to as $\theta_k$, with k being the reference number 1, 2 or 3 of the transmitting mobile station MS1, MS2 or MS3 respectively, and that the power of the received signal is expressed by $\sigma_k$.

The N sensors $A_1$ to $A_N$ are connected to a signal processor SP constituted by N radio receivers (not shown) connected to distinct sensors. These radio receivers are adapted to provide, at an output of SP, a signal vector X which is indicative of the signals received on the sensors $A_1$ to $A_N$. The signal vector X is applied both to a time window filter TWF and to a first input of N-1 multipliers $M_1$ to $M_{N-1}$.

The time window filter TWF is controlled by a timing control circuit CTL which operates in synchronism with the above channels. An output of the time window filter TWF is connected to a weight parameter estimator WPE and the timing control circuit CTL controls TWF in such a way that the latter only opens a time window during the RACH channel, i.e. allows the signal vector X to be transmitted to WPE only during the time slot of a RACH channel.

The weight parameter estimator WPE is essentially constituted by a Wiener filter estimator adapted to provide at its output the identity of the emitting mobile station $MS_k$ and corresponding weight parameters such as the direction of arrival $\theta_k$ and the signal power $\sigma_k$ all derived from the signal vector X. An output of WPE is connected to a weight vector generator WVG which is itself connected in a bidirectional way to a parameter data base PDB, both WVG and PDB being controlled by the timing control circuit CTL.

Devices as the weight parameter estimator WPE and the weight vector generator WVG are generally known in the art, e.g. from the book "Signal Processing—Model Based Approach" of J. C. Candy, edited by Mc. Graw Hill, and are therefore not described in more detail hereafter.

The identity $MS_k$, the angle $\theta_k$ and power $\sigma_k$ estimated by the weight parameter estimator WPE are transferred to the parameter data base PDB via the weight vector generator WVG. PDB stores these parameters and WVG calculates therewith a weight vector $W_k$ which is then also stored in PDB. An output of the parameter data base PDB, through which weight vectors are provided, is connected to second inputs of the multipliers $M_1$ to $M_{N-1}$.

The outputs of the N-1 multipliers constitute N-1 array output terminals $X_1$ to $X_{N-1}$ where like named array output signals are provided, the latter being equal to the product of the vectors applied to the first and second inputs of these multipliers.

The array output terminals $X_1$ to $X_{N-1}$ are further coupled to a channel controller CHC which, based on information collected at these terminals, allocates or re-allocates traffic channels TCH to the emitting stations MS as will be explained later. An output IHO of the channel controller CHC is connected to the weight vector generator WVG which recalculates the weight vectors when another TCH channel is allocated by CHC to an emitter station MS.

It is to be noted that the identity of the TCH channel allocated by CHC to each emitting station MS1 to MS3 is also stored in the parameter data base PDB.

The receiver circuit RM including the signal processor SP, the timing control circuit CTL, the time window filter TWF, the weight parameter estimator WPE, the weight vector generator WVG, the parameter data base PDB, the N-1 multipliers $M_1$ to $M_{N-1}$ and the channel controller CHC operates as follows.

When during a RACH channel only one of the mobile stations, say MS1, is transmitting a call set-up packet SUP1, this packet arrives at the array of sensors at a moment t1 and with an angle $\theta_1$. The signal processor SP then generates a signal vector $X_1$ representative of the received call set-up packet SUP1. Since this occurs during a RACH channel, the time window filter TWF is open and the signal vector $X_1$ is transmitted to the weight parameter estimator WPE which derives therefrom weight parameters $\theta_1$ and $\sigma_1$ indicative of the quality of the received signal. These parameters are applied to the weight vector generator WVG which calculates a first weight vector $W_1$. The latter is transferred to the parameter data base PDB together with the identity MS1 of the emitting station and the weight parameters. All this information is stored in PDB while the weight vector $W_1$ is simultaneously also applied to the second input of the multiplier $M_1$. Because the signal vector $X_1$ is then still available at the first input of this multiplier $M_1$, the latter produces an array output signal $X_1$ which corresponds to the product of the signal vector $X_1$ and the weight vector $W_1$. This array output signal $X_1$ derived from the call set-up packet SUP1 captured by the array of sensors $A_1$ to $A_N$ is then transmitted further in the base station BST as well as to the channel controller CHC. Because this call set-up packet is the first packet received from the mobile station MS1, the channel controller CHC allocates to this station a traffic channel TCH of which the identity is transmitted to the weight vector generator WVG via the terminal IHO. This channel identity is then further transferred to the parameter data base PDB wherein it is stored in association with the above information relating to the station MS1.

As no other mobile station is transmitting in the same RACH channel, the other weight vectors $W_2$ to $W_{N-1}$ applied to the multipliers $M_2$ to $M_{N-1}$ are zero so that the array output signals at the array output terminals $X_2$ to $X_{N-1}$ are also equal to zero.

If a second call set-up packet SUP2 is transmitted by another emitter station MS2 in the same RACH channel and reaches the array of sensors with an angle $\theta_2$ different from $\theta_1$ and at a time moment t2 which is at least 5 μsec later than t1, the signal processor SP generates another signal vector $X_2$ representative of the two received call set-up packets SUP1 and SUP2. From this signal vector $X_2$, the weight parameter estimator WPE derives two sets of parameters: MS1, $\theta_1$, $\sigma_1$ and MS2, $\theta_2$, $\sigma_2$. The weight vector generator WVG uses these two sets of parameters to calculate two weight vectors $W_1$ and $W_2$ which are stored in the parameter data base PDB while being simultaneously transmitted to the second inputs of the multipliers $M_1$ and $M_2$ respectively. Since the signal vector $X_2$ is still applied to the first inputs of the multipliers $M_1$ and $M_2$, $M_1$ still produces an array output signal $X_1$ which is derived from the call set-up packet SUP1 received by the array of sensors $A_1$ to $A_N$, while $M_2$ now produces an array output signal $X_2$ derived from the call setup packet SUP2 also received by this array of sensors. Based on the array output signals $X_1$ and $X_2$, the channel controller CHC allocates a traffic channel TCH to each of the emitting stations MS1 and MS2. The identities of these channels are then transmitted to and stored in the parameter data base PDB via the weight vector generator WVG. These channel identities are obviously stored in association with the other already stored parameters of the corresponding emitting stations MS1 and MS2 respectively.

Summarizing, two distinct array output signals $X_1$ and $X_2$, corresponding to respective ones of the received call set-up packets SUP1 and SUP2 received in a same RACH channel, are acquired by the base station BST and are available at the two distinct array output terminals $X_1$ and $X_2$ of the receiver circuit RM. More generally, up to N-1 array output signal $X_1$ to $X_{N-1}$ derived from N-1 distinct call set-up packets acquired by the base station BST can be produced at the array output terminals of the receiver circuit RM providing that they arrive at the array of sensors with different angles $\theta_k$ and at a different time moments separated by at least 5 μsec. As already mentioned, in the present GSM application these 5 μsec correspond to 1.5 bit which, at a bit rate of 270 kbit/second, allow known Wiener filter estimators to gather a sufficient number of signal samples (snapshots) to correctly estimate the properties of the incoming signal.

For K signals reaching at the array of sensors $A_1$ to $A_N$, each with an angle $\theta_k$, the vector signal X at the output of the signal processor SP may be written as $$\underline{X} = \sum_{k=1}^{K} S_k \cdot d_k + n$$

wherein:

k is the reference number of one of the K transmitting mobile stations;

$S_k$ is the complex amplitude of a received signal and is equal to $$S_k = e^{j2\pi f_c t} \cdot S_k(t)$$

with $S_k(+) \in [-1,+1]$ $d_k$ is the relative phase vector and is equal to $$d_k = (1, \ldots, e^{-j\phi_k}, \ldots, e^{j \, -j(N-1)\phi_k})^T$$

wherein T denotes "transpose" and $$\phi_k = 2\pi d \sin \frac{\Theta_k}{\lambda_c}$$

d being the spacing between two consecutive elements of the array of sensors $A_1$ to $A_N$; and n is the noise vector and equals $$n = (n_1, \ldots, n_N)$$

The "Wiener Filter Vectors" $W_k$ produced by the weight vector generator WVG and used to separate the different incoming signals may be written $$W_k = (w_{k_1}, \ldots, w_{k_N})$$

whereby an array output signal $X_1$ is equal to $$X_i = W_i \cdot X = (W_i d_i) S_i + \sum_{k=1/k \neq i}^{N-1} W_i d_k S_k + W_i n$$

As the weight vectors produced by the weight vector generator WVG are such that the corresponding signal-tonoise/interference ratio is maximized, the two last terms of the last equation, representing possible interference and noise respectively, are negligible in the following cases:

when the mobile stations transmitting the call set-up packets are not seen from a same angle by the array of sensors; and when the noise is spatially white and/or when no jamming source is seen from the same angle of one of the transmitting mobile stations.

By using the above described receiver circuit, it is thus possible to dramatically increase the capability of the above mentioned Slotted-ALOHA protocol without increasing the number of channels used therefore. Moreover, the same principle is valid to separate N-1 user information packets transmitted by N-1 different mobile stations in a same traffic channel TCH.

As already mentioned, a same traffic channel TCH may be allocated to several mobile stations and once a traffic channel TCH is allocated to such an emitter station, the latter is authorized to use it for transmitting user information packets to the base station and so further to another user. As for the call set-up packets, the signal processor SP generates a signal vector X for the user information packets received at the array of sensors $A_1$ to $A_N$. However, during the TCH channels the time window filter TWF is closed and no parameters are provided at the output of the weight parameter estimator WPE. In that case, the weight vectors corresponding both to the current channel TCH and to the emitting mobile stations allowed to transmit in that channel are supplied by the parameter data base PDB to the second inputs of the multipliers. These weight vectors were previously calculated by the weight vector generator WVG during a preceding RACH channel and stored in the parameter data base PDB as associated to that particular TCH channel and mobile station MS.

As it may be derived from the above equations, up to N-1 mobile stations are allowed to transmit user information packets in a same channel TCH and the corresponding output information appears to the N-1 array output terminals $X_1$ to $X_{N-1}$. Although this is true in theory, the current technological constraints rather limit to N/2 the number of stations allowed to use a same channel.

Because the emitting stations are mobile and thus moving within the cell covered by the base station BST their associated weight vectors may need to be updated, e.g. as a function of changes of the weight parameters if the position of the mobile station is modified. Therefore, to maintain an optimal quality of the communication, the transmitting mobile stations periodically transmit tracking packets in the RACH channels. These tracking packets are similar to the above call set-up packets and, as they are also transmitted in a RACH channel when the time window filter is open, the weight parameter estimator WPE derives therefrom updated weight parameters which are transferred to the weight vector generator WVG. The latter then calculates new weight vectors for all the mobile stations using the traffic channel TCH of the station transmitting the tracking packet. These new weight vectors, constructed by using both the parameters received from WPE and those already stored in PDB, are then stored in this parameter data base PDB in replacement of the existing ones.

It is further also possible that the array output signals received in a particular traffic channel TCH becomes such that the base station BST can no longer distinguish one of them from the others, i.e. that the incoming signals can no longer be separated. These "interferences" may for instance be due to changes in relative positions of two or more transmitting mobile stations. When the channel controller CHC detects such an interference, it allocates another TCH channel to at least one of these transmitting mobile stations. The channel re-allocation is called "intra cell hand over" and leads the weight vector generator WVG to calculate a new weight vector not only for the concerned mobile station but also for all the mobile stations using either the previous or the new traffic channel TCH thereof.

It is to be noted that the above description has been made with a base station BST provided with an array of sensors performing an omnidirectional coverage of the cell but that the same reasoning can be applied to a sectorized coverage of the cell, each sector being handled as described above.

While the principles of the invention have been described above in connection with specific apparatus, it is to be clearly understood that this description is made only by way of example and not as a limitation on the scope of the invention.

We claim:

1. Radio telecommunication system including a plurality of emitter stations adapted to transmit packets of data in predetermined channels of a radio link to a receiver station provided with an array of sensors for capturing the transmitted data and with receiver means coupled to said array of sensors and adapted to generate array output signals at array output terminals of said receiver station, said receiver means including a weight vector supplier means coupled to said array of sensors and adapted to derive weight vectors from the captured data, and a plurality of multiplier means coupled to said array of sensors and to said weight vector supplier means for providing said array output signals as a function of the product of said captured data and weight vectors, wherein said receiver means further includes signal processing means coupled between said array of sensors and both said weight vector supplier means and said plurality of multiplier means and adapted to generate from said captured data a signal vector from which said weight vector supplier means derives a plurality of weight vectors, and wherein such weight vectors are applied to distinct ones of said multiplier means.

2. Radio telecommunication system according to claim 1, wherein each of said predetermined channels is a predetermined time slot at a predetermined frequency of said radio link, and wherein said weight vector supplier means includes a series coupling of a weight parameter estimator which derives a plurality of weight parameters from said signal vector and a weight vector generator which calculates, from said derived weight parameters, said plurality of weight vectors, said weight parameter estimator and said weight vector generator for distinguishing transmit packets transmitted during first ones of said predetermined channels by different ones of said emitter stations.

3. Radio telecommunication system according to claim 2, wherein said weight vector supplier means further includes a parameter data base coupled between said weight vector generator and said multiplier means for storing said derived weight parameters and calculated weight vectors.

4. Radio telecommunication system according to claim 3, wherein during first ones of said predetermined channels said weight vectors calculated by said weight vector generator are applied to said multiplier means and said weight parameters are stored in said parameter data base.

5. Radio telecommunication system according to claim 2, wherein said weight vector supplier means further includes a time window filter means coupled between said signal processing means and said weight parameter estimator and controlled by a timing control means also included in said weight vector supplier means, said time window filter means allowing said signal vector to be transmitted to said weight parameter estimator only during said first ones of said predetermined channels thereby allowing said weight parameter estimator to derive said plurality of weight parameters from said captured data only during said first ones of said predetermined channels.

6. Radio telecommunication system according to claim 5, wherein during second ones of said predetermined channels different from said first ones of said predetermined channels, said weight vectors are applied to said multiplier means.

7. Radio telecommunication system according to claim 6, wherein a duration of the predetermined time slot of each of said second ones of said predetermined channels is substantially equal to a duration of a transmission of a data packet, and wherein each predetermined time slot of said first ones of said predetermined channels and said second ones of said predetermined channels all have a same duration.

8. Radio telecommunication system according to claim 5, wherein a duration of the predetermined time slot of each channel of said first ones of said predetermined channels is longer than a duration of a transmission of a data packet, wherein relative time positions of data packets within said time slot of said each channel of said first ones of said predetermined channels is different for each emitting station among said emitter stations, and wherein said data packets have a different direction of arrival with respect to said array of sensors.

9. Radio telecommunication system according to claim 8, wherein said receiver station is a fixed base station, wherein said emitter stations are mobile stations, wherein the data packets transmitted by said mobile stations in said first ones of said predetermined channels are call set-up/tracking packets used to establish/maintain a communication with said base station.

10. Radio telecommunication system according to claim 9, wherein the data packets transmitted by said mobile stations in second ones of said predetermined channels different from said first ones of said predetermined channels are user information packets.

11. Radio telecommunication system according to claim 10, wherein said array output terminals are connected to a channel controller adapted to allocate corresponding ones of said second ones of said predetermined channels to corresponding emitting stations transmitting a call set-up packet during a channel of said first ones of said predetermined channels, and wherein said channel controller is coupled to a parameter data base which stores an identification of said corresponding ones of said second ones of said predetermined channels allocated by said channel controller.

12. Radio telecommunication system according to claim 11, wherein said channel controller is coupled to said parameter data base via said weight vector generator which calculates a weight vector for an emitting station in an allocated one of said second ones of said predetermined channels as a function of data stored in said parameter data base and relating to said allocated one of said second ones of said predetermined channels.

13. Radio telecommunication system according to claim 12, wherein said channel controller is further adapted to allocate another one of said second ones of said predetermined channels to said emitting station when a communication quality of the latter is below a predetermined level, and wherein said weight vector generator then calculates, for all the emitting stations in both a previous and said another one of said second ones of said predetermined channels allocated to said emitting station, new weight vectors as a function of data stored in said parameter data base and relating to said emitting station and to both said previous and said another one of said second ones of said predetermined channels allocated to said emitting station.

14. Radio telecommunication system according to claim 12, wherein when a communication is established with said base station said emitting station transmits tracking packets in said first ones of said predetermined channels, wherein said weight parameter estimator derives from said tracking packets new weight parameters which are stored in said parameter data base, wherein said weight vector generator accordingly calculates new weight vectors for all the emitting stations in the corresponding ones of said second ones of said predetermined channels allocated to said emitting stations transmitting said tracking packets, and wherein said new weight vectors are also stored in said parameter data base.

15. Radio telecommunication system according to claim 5, wherein during second ones of said predetermined channels different from said first ones of said predetermined channels, said calculated weight vectors stored in said parameter data base are applied to said multiplier means.

16. Radio telecommunication system according to claim 2, wherein said signal vector is applied to a first input of each of said multiplier means of said plurality, wherein said weight vectors are applied to second inputs of said multiplier means, and wherein each of said multiplier means is connected a distinct one of said array output terminals to provide thereat an array output signal which is equal to a product of said signal vector and said weight vector.

17. Radio telecommunication system according to claim 2, wherein said weight parameter estimator is a Wiener filter estimator.

18. Radio telecommunication system according to claim 1, wherein said array of sensors includes N antenna elements, wherein said weight vector supplier means produces a maximum of N-1 weight vectors, and wherein said plurality of multiplier means includes N-1 multiplier means coupled to N-1 of said array output terminals.

19. Radio telecommunication system according to claim 18, wherein said array of sensors is a uniform linear array (ULA) and wherein said N antenna elements are identical isotropic sensors that are uniformly separated.

20. Radio telecommunication system according to claim 1, wherein for K signals reaching the array of sensors $A_1$ to $A_N$, each with an angle $\theta_k$, said signal vector (X) provided by said signal processing means is defined by $$\underline{X} = \sum_{k=1}^{K} S_k \cdot d_k + n$$

wherein k is a reference number of one of said emitter stations, $S_k$ is a complex amplitude of said transmitted data and is defined by $$S_k = e^{j2\pi f_c t} \cdot S_k(t), \text{ with } S_k(t) \in [-1,+1], \text{ where}$$

$d_k$ is a relative phase vector and is defined by $$d_k = (1, \ldots, e^{-jk\phi_k}, \ldots, e^{-j(N-1)\phi_k})^T,$$

where T denotes a transpose operation, where $$\phi_k = 2\pi d \sin \frac{\Theta_k}{\lambda_c},$$

d being a spacing between two consecutive elements of said array of sensors, where $f_c$ is a predetermined frequency and $\lambda_c$ is a corresponding wavelength of said radio link, and where n is a noise vector defined by $n = (n_1, \ldots, n_N)$.

* * * * *

UNITED STATES PATENT AND TRADEMARK OFFICE
CERTIFICATE OF CORRECTION

PATENT NO. : 5,548,834
DATED : August 20, 1996
INVENTOR(S) : Suard, et. al.

It is certified that error appears in the above-indentified patent and that said Letters Patent is hereby corrected as shown below:

Title page, item [57], Abstract, line 9, cancel "channel" after "(RACH); and at line 13, cnacel "channel" after " (TCH)".

Column 14, line 38 (claim 20, line 3) change "(X)" to -- (X) --.

Signed and Sealed this

Nineteenth Day of November, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,548,834
DATED : August 20, 1996
INVENTOR(S) : Suard et al

It is certified that error appears in the above-indentified patent and that said Letters Patent is hereby corrected as shown below:

At column 14, line 46, please cancel

"$S_k = e^{j2\pi f_c t} \cdot S_k(t)$, with $S_k(t) \in [-1,+1]$, where"

and substitute therefor

--$S_k = e^{j2\pi f_c t} \cdot s_k(t)$, with $s_k(t) \in [-1,+1]$, where --.

At column 14, line 52, please cancel

"$d_k = (1, \ldots, e^{-jk\phi_k}, \ldots, e^{-j(N-1)\phi_k})^T$"

and substitute therefor

--$d_k = (1, \ldots, e^{-jk\phi_k}, \ldots, e^{-j(N-1)\phi_k})^T$ --.

Signed and Sealed this

Fifteenth Day of April, 1997

Attest:

BRUCE LEHMAN

*Attesting Officer*  *Commissioner of Patents and Trademarks*